United States Patent [19]

Schmid et al.

[11] Patent Number: 5,174,832
[45] Date of Patent: Dec. 29, 1992

[54] METHOD FOR CONTACTLESS DIGITAL MEASURING OF THE DISPLACEMENT OR POSITION OF A MOVABLE PIECE

[75] Inventors: Felix Schmid, Belfaux; Heinrich K. Feichtinger, Hinteregg, both of Switzerland

[73] Assignee: Vibro - Meter SA, Switzerland

[21] Appl. No.: 729,620

[22] Filed: Jul. 15, 1991

[30] Foreign Application Priority Data

Jul. 13, 1990 [CH] Switzerland ............... 02348/90

[51] Int. Cl.$^5$ ............................................. C23C 10/06
[52] U.S. Cl. ............................. 148/122; 148/509
[58] Field of Search ............... 148/122, 136, 137, 121, 148/1, 4, 16, 16.7, 910, 901, 100, 108, 508, 509

[56] References Cited

U.S. PATENT DOCUMENTS

| | | | |
|---|---|---|---|
| 4,514,236 | 4/1985 | Cook et al. | 148/137 |
| 4,610,734 | 9/1986 | Hartwig et al. | 148/121 |

*Primary Examiner*—R. Dean
*Assistant Examiner*—Sikyin Ip
*Attorney, Agent, or Firm*—Ostrolenk, Faber, Gerb & Soffen

[57] ABSTRACT

A method for manufacturing a device for contactless and digital measurement of a linear or angular condition of a first piece with respect to a second piece. A series of ferromagnetic encoding marks are provided onto a non-magnetic substrate of one of the pieces. The encoding marks are produced by a strongly local heating of the surface of a non-magnetic substrate of an austenitic steel stabilized by a metalloid in interstitial solution. Displacement, speed and acceleration of a linear or angular kind of one piece with respect to a second piece can thereby be measured with great accuracy.

15 Claims, 3 Drawing Sheets

METHOD FOR CONTACTLESS DIGITAL MEASURING OF THE DISPLACEMENT OR POSITION OF A MOVABLE PIECE

BACKGROUND OF THE INVENTION

This invention basically relates to the field of machinery. It is specially related to a contactless and digital measuring method of the linear or angular condition of one piece with respect to another piece, these two pieces being movable in relation to each other, based on the reading of a metallic encoding pattern detectable by a magnetic reading device fixed on one of the two pieces.

The invention further contemplates a device for implementing the method, and a method for the manufacture of the device.

Similar measuring devices are already known. Thus, published EP-A1-0,027,308 discloses a magnetic scale for measuring a displacement, comprising a locally magnetized magnetic substrate. French patent FR-A-2,030,713 describes a well known non-metallic and conventional magnetic tape including spaced magnetic information for measuring. An information bulletin (IBM Vol. 6 no. 2 of Jul. 1963) mentions that non-magnetic nickel coated with kanigan can be rendered magnetic by heating to about 400° C. German publication DE-A1-1,623,242 discloses a measuring system based on the detection of a continuously growing magnetic field in linear direction. Finally, European publication EP-A1-0,310,543 discloses a magnetic pattern on a magnetic substrate, the magnetic force of the pattern being different form that of the substrate.

All devices already proposed and suggested have the common disadvantage that the shape and intensity of the finally obtained measuring signal and its sharpness with respect to the non-encoded environment or substrate are by far not satisfactory. Conventional tapes cannot be used in the severe conditions of machinery.

SUMMARY OF THE INVENTION

An important object of the invention is to provide a method and a device for measuring the condition of one piece movable in relation to another piece, and which method and device are less complicated than the aforesaid known methods and devices.

Another object of the invention is to provide a measuring method and device which avoid the disadvantages of the known systems.

If is a further object of the invention to provide a measuring method and device giving clearly distinct digital measuring, signals of high amplitude, compared with known systems where the magnetic encoding comprise magnetic marks on a substrate of different magnetism or even simply a magnetic device whose magnetism continuously increases in a linear manner from one end to the other.

The invention provides a measuring system of the above defined kind, comprising distinct marks forming an encoding pattern, where the marks are not magnetized by themselves but consist of ferromagnetic marks embedded in a non-magnetic substrate and formed by local heating.

In the following, the invention will be described in greater details.

The substrate selected for the encoding pattern is an austenitic, non-magnetic steel. The stability of the austenitic structure is realized by the presence of a metalloid in interstitial solution with the pattern of differential magnetic properties is obtained by local heating of the surface of the substrate at a high intensity. This local heating causes depletion of that metalloid within the heated region and thus a local destablisation of the non-magnetic austenitic structure which is thus transformed into a ferromagnetic ferritic structure.

This structure has therefore no permanent magnetism and can also not be made permanently magnetic. The pattern on the surface of one or both pieces comprising alternating non-magnetic austenitic zones and ferromagnetic ferritic zones, it is possible to measure by increments the displacement of the movable piece by means of a reversibly counting device which counts the number of pulses when the other piece comprises a read device guided over the surface of the pattern, see FIG. 1.

Another feature of the invention is that, when the impulsions are derived with respect to time, it is possible to determine the speed and, by the second derivation, the acceleration of the moving piece.

Furthermore, if the encoding is an appropriate particular pattern, it is possible to detect the absolute position of the movable piece, using two or more detector or reading devices if necessary.

The encoding pattern may be formed in a rod in order to detect its linear displacements, e.g. a reciprocating movement, or in a disk to detect angular or rotational displacements.

The encoding mentioned above is not limited to the feature of detecting data such as position, speed and acceleration but also allows encoding of any element of a machine capable of producing a signal such as number of a cylinder or a valve, number of a sensor, maximum length of a stroke, or other parameters which identify a device. A security code may also be appropriate or necessary to confirm that the measuring scale is coupled with the correct read device. Such an encoding, in binary form, may be produced in parallel to the main code pattern, or at the beginning or the end of the stroke of a movable piece.

An already known measuring device, see EP-A1-0,310,543, has a substrate composed of a usual ferromagnetic steel treated by a laser beam for locally heating surface spots of the substrate. The laser beam produces, for example, dots or dashes normal to the displacement direction of the piece, these dots or dashes having other magnetic propreties than the substrate.

It has, however, been found that the transitions between the said marks and the substrate are not sharp, and it is therefore difficult to read the coding information from the magnetic substrate.

The encoding pattern of the invention is obtained by a strongly localized heating of the substrate surface which is possible by means of a laser beam, an electron beam, an ion beam, an electric arc or a short duration electric discharge. In applying these techniques, the width and the depth of a mark are typically of the same order of magnitude. Because the invention uses a non-magnetic substrate, it is possible to produce and detect a very fine and very dense pattern and thus to obtain a very high resolution of the measuring method.

Another advantage of the invention is that the piece which bears the ferromagnetic pattern may be an integral part of any machinery device.

It is well known that certain elements of iron alloys have a strong action on their structure which consists in stabilizing of the ferritic or austenitic structures. Such elements are preferably nitrogen and/or carbon in interstitial solution in the iron. These two elements have a very remarkable influence on the enlargement of the field of existence of the austenite. Steels having a high content of nitrogen have therefore been developed during the second World War in order to save the rare nickel.

The addition of a metalloid to steels has still other reasons. Carbon and nitrogen improve, when being in interstitial solution, hardness, yielding point and tensile strength of these steels but, in contrast to the presence of carbon, the addition of nitrogen does not lead to a great loss of tenacity.

For this reason, when for example a stainless steel containing 18% of chromium and 18% of manganese is combined with 0.5% of nitrogen and less than 0.05% of carbon, a material is obtained whose combination of tensile, strength and tenacity attain a maximum which is today possible.

If the content of nitrogen is less than 0.45 to 0.48%, the austenite structure is replaced by a ferritic one or, in other words, the austenite is transformed into ferrite when nitrogen is removed, for example, by diffusion following a local heating.

Furthermore, alloyed nitrogen will raise the strain hardness and the resistance to corrosion, and therefore such a steel can well be used in a strongly stressed and mechanical device in a corrosive environment.

Another property of the metalloid elements carbon and nitrogen in interstitial solution in iron alloys is that, due to their relatively small atomic volume, their diffusion coefficient is much higher than that of most other alloy elements of the iron, and this property makes the production of marks much easier which form the ferromagnetic pattern.

Non-magnetic iron alloys having a high chromium content have furthermore a very interesting property which differs from the normal solubility behavior of gases in metals. Normally, the solubility of a gas in a metal increases with temperature and especially when the metal passes from the solid to the liquid state. Nitrogen in the aforesaid alloys behaves ,otherwise, namely its solubility diminishes with rising temperature of the solid state, it further decreases during the melting process, and it falls further when the liquid metal is superheated.

The effectiveness, of the magnetic marks formation by local heating of a non-magnetic substrate can further be improved when a concentration difference of the metalloid to the surface of the workpiece is realized. This will indicate that, when the metalloid liberated by heating the surface is constantly removed from that surface, the rate of the diffusion to that surface is increased. The removal may be operated by giving the liberated metalloid the possibility of leaving the surface in forming an environment depleted of metalloid, for example, and in the case of nitrogen, a vacuum or an inert gas atmosphere free from nitrogen, and in the case of carbon, an oxidizing atmosphere which transforms the carbon into CO or $CO_2$ but not aggressively enough to oxidize the whole surface, or a reducing atmosphere to tranform the carbon into methane or a similar hydrocarbon.

BRIEF DESCRIPTION OF THE DRAWING

The invention will now be described in more detail with reference to the attached drawings. However, the following is by no means to be considered as limiting the invention thereto.

In the drawings.

DETAILED DESCRIPTION

Figure 1A:
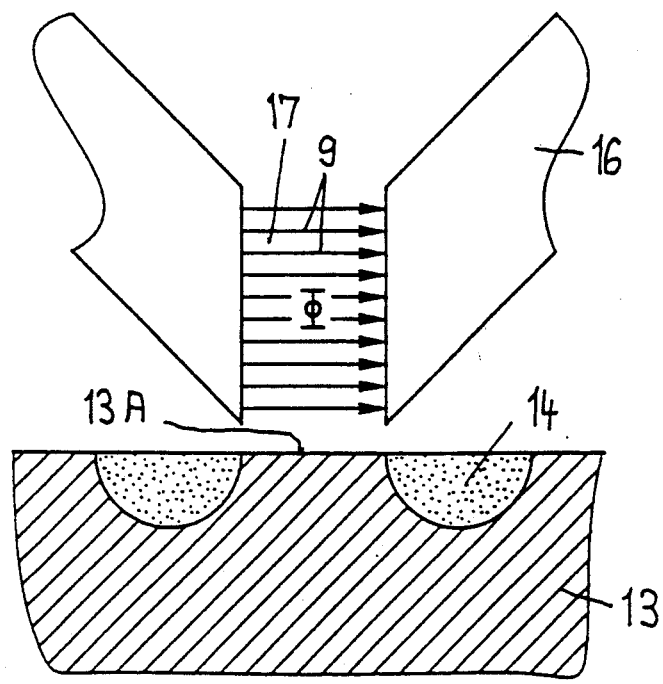
FIGS. 1A and 1B show in a simplified, schematic view, the functional principle of the invention.
Figure 1B:
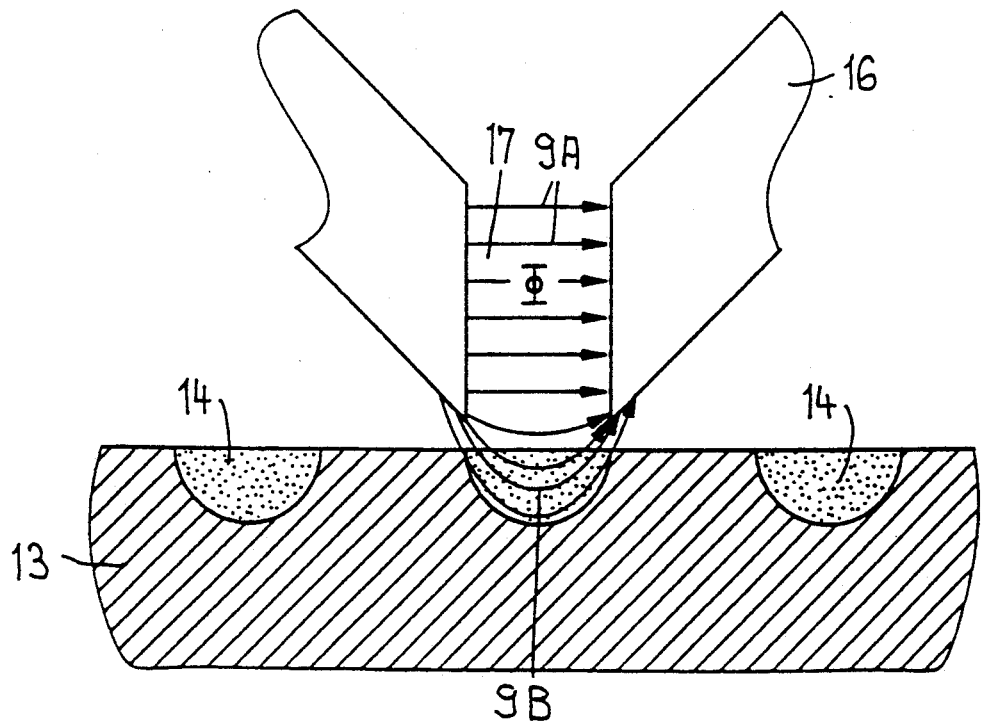

FIGS. 1A and 1B show very schematically the coding detection principle of the invention.

The device comprises a workpiece or substrate 13 made of non-magnetic austenitic steel as already described. Encoding marks 14 of ferritic and ferromagnetic steel have been produced in the manner described above. A magnetic circuit of a read head 16 is placed closely above the surface of the piece 13 for mutual horizontal displacement in the plane of FIGS. 1A and 1B, with an air-gap 17 arranged as shown. The magnetic field $\Phi$ in the air-gap is shown by lines of magnetic flux 9.

When the read head 16 with its air-gap 17 is placed above a non-magnetic portion 13A of the piece 13, the magnetic field $\Phi$ has a certain, given strength. In contrast, when the air gap 17 is in front of a ferritic ferromagnetic encoding mark 14 (FIG. 1B), a portion 9B of the magnetic field lines are deviated from the air-gap 17 through the mark 14. The field lines 9A remaining in the air-gap have a lower density than before, and a change of magnetic flux appears in the detector head 16 which will be detected by an appropriate electric winding.

Figure 2:
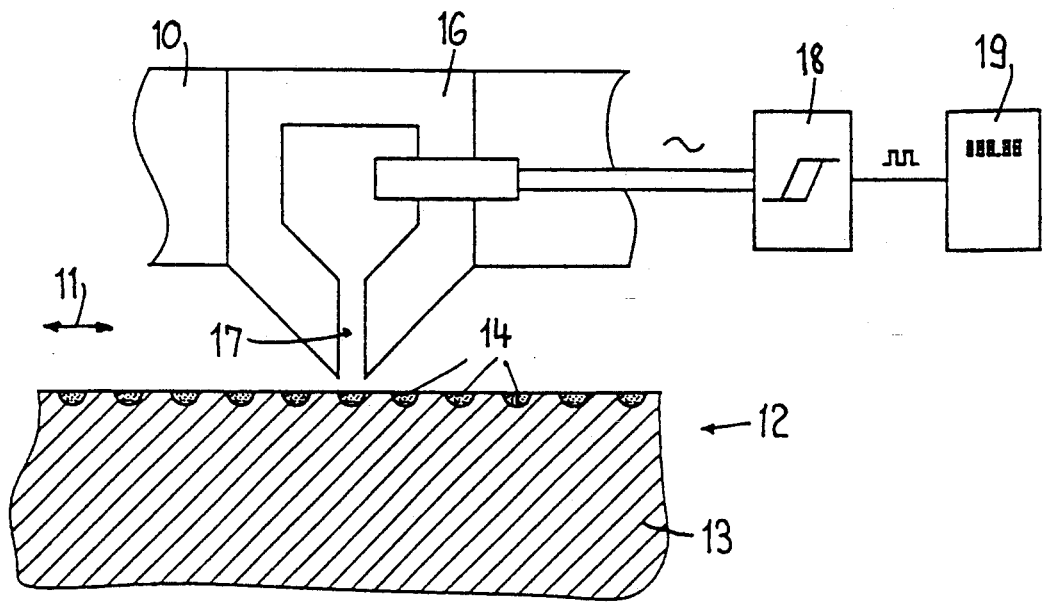
FIG. 2 represents a first application of the process of the invention, i.e. a first embodiment of a device according to the invention.

FIG. 2 shows the case where the linear relative displacement, the speed or the acceleration of two devices 12 and 10, which are mutually movable in the direction of arrow 11, should be measured. The piece 12 comprises a main body 13 of non-magnetic austenitic steel whose surface carries ferromagnetic coding marks 14 of ferritic steel which define a predetermined pattern, obtained by local and confined heating of the surface of piece 12.

The other piece 10 of the pair 10, 12 comprises a magnetic read head 16 whose air-gap is directed towards the magnetic pattern of marks 14. When the piece 10 is moved with respect to the piece 19, or vice versa, each of the ferromagnetic marks 14 cause a variation of induction in the air-gap 17 and thus a perturbation in the magnetic circuit of the head 16. This perturbation is detected by means sensitive to variations of the magnetic field, for example a Hall cell or a magnetoresistor associated with a permanent magnet. The wave signal supplied by the head 16 is fashioned into electric pulses, e.g. by means of a Schmitt trigger 18. The pulses obtained are then transmitted, to an electronic counter 19. The number of counted impulses and their first and second derivatives with respect to time determine the values of displacement, speed and acceleration, respectively.

Figure 3:
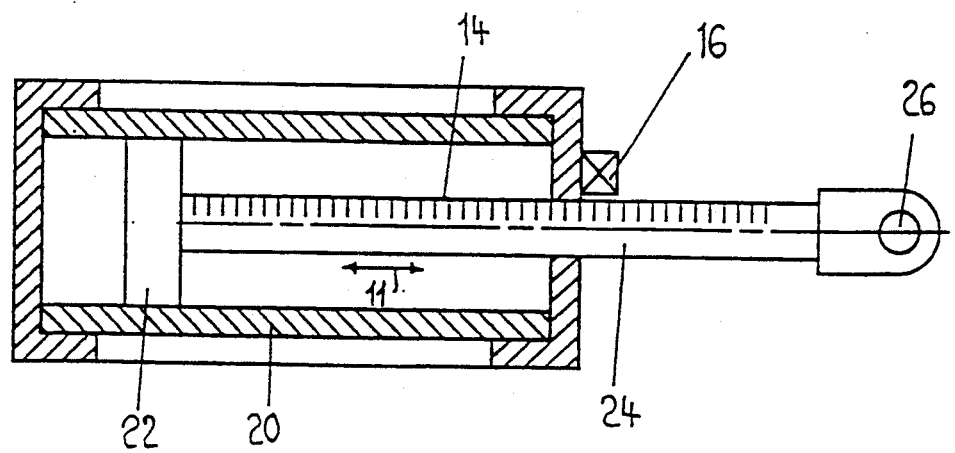
FIG. 3 shows a second application of the process of the invention, i.e. a second embodiment of a device according to the invention.

FIG. 3 shows a second realization in practice. The encoding marks 14 are produced in a piston rod 24 connected to a piston 22 which makes a reciprocating movement according to the arrow 11 in a hydraulic cylinder 20. The piston rod 24 may be connected to other mechanical devices via the eyelet 26. The read head 16 cooperates with the marks 14 in the manner described above.

Figure 4:
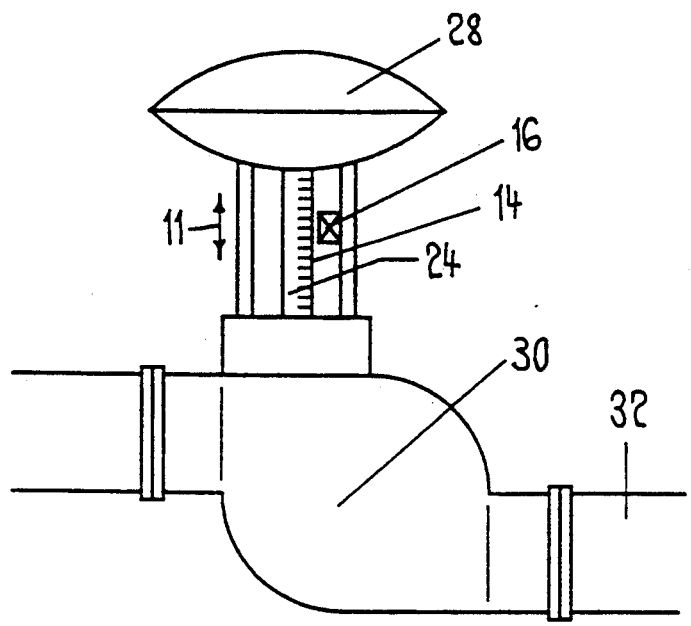
FIG. 4 shows a third application of the process of the invention, i.e. a third embodiment of a device according to the invention.

In FIG. 4, the position control and detection of a slide valve 30, inserted into a conduit 32, is shown as a further example. The hydraulic, pneumatic, electric or mechanic actuator 28 drives the valve rod 24 which comprises the ferromagnetic encoding pattern described above, and its displacement according to arrow 11 is detected by the read head 16. When the pulses created by the displacement of marks 14 relative to the head 16 are counted, the opening state of the valve 30 can be detected remotely.

Figure 5:
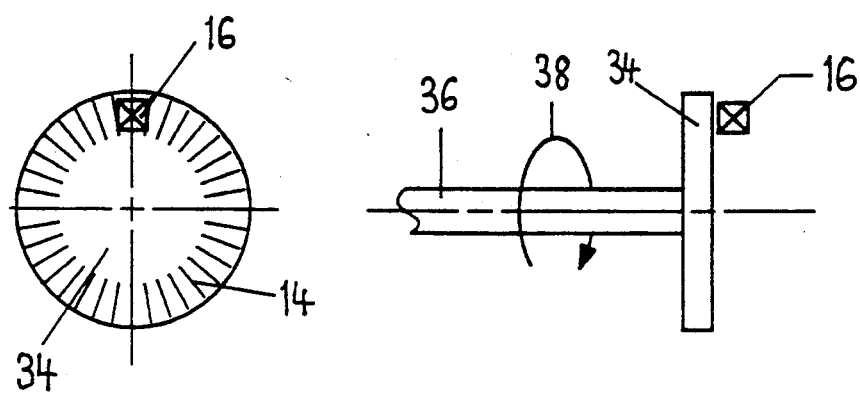
FIG. 5 represents an application of the invention to angular measurements, and shows a fourth embodiment of a device according to the invention.

Finally, FIG. 5 shows the determination of the angular position or the rotational speed of a shaft 36 which comprises, for this purpose, an austenitic disk 34 having ferromagnetic encoding marks 14. The passage of these marks 14 past a read head 16 gives, as already described, the information on the rotational displacement of the disk 34 and, thus, the shaft 36 according to arrow 38.

The sum of all properties and conditions described above allows achieving the objectives of the invention, namely the production of a local ferromagnetic pattern embedded in a non-magnetic substrate.

We claim:

1. A method for the manufacture of a device for contactless and digital measurement of a linear or angular condition of a first piece with respect to a second piece comprising the steps of:

providing one of said first and second pieces as a substrate of austenitic steel;

stabilizing said substrate of austenitic steel by incorporating therein a metalloid which is in interstitial solution in the substrate, thereby providing a stabilized substrate; and producing a ferromagnetic encoding pattern in said stabilized substrate of austenitic steel, said ferromagnetic encoding pattern being detectable by magnetic read means, the step of producing said ferromagnetic encoding pattern comprising locally surface heating a portion of the stabilized substrate of austenitic steel according to a desired encoding pattern.

2. The method of claim 1, wherein the step of stabilizing with a metalloid comprises providing nitrogen in interstitial solution in the substrate.

3. The method of claim 1, wherein the step of stabilizing with a metalloid comprises providing carbon in interstitial solution in the substrate.

4. The method of claim 1, further comprising the step of holding the locally heated surface portions of the austenitic substrate in contact with an atmosphere poor in the metalloid, the metalloid thereby leaving the heated surface portions by accelerated diffusion and migrating into said atmosphere.

5. The method of claim 2, wherein said step of holding comprises placing the locally heated surface portion of the substrate in an atmosphere having a low partial pressure of nitrogen .

6. The method of claim 4, wherein said step of holding comprises placing the locally heated surface portions of the substrate in an atmosphere having an oxygen partial pressure capable of transforming carbon atoms transported by diffusion to the surface of the substrate into carbon monoxide without yielding a substantial oxidation of the steel surface.

7. The method of claim 4, wherein said step of holding comprises placing the locally heated surface portions of the substrate in an atmosphere having a hydrogen partial pressure capable of transforming carbon atoms transported by diffusion to the surface of the substrate into methane.

8. The method of claim 1, wherein said step of locally surface heating comprises heating with a laser beam.

9. The method of claim 1, wherein said step of locally surface heating comprises heating with an electron beam.

10. The method of claim 1, wherein said step of locally surface heating comprises heating with a beam of ions.

11. The method of claim 1, wherein said step of locally surface heating comprises heating with an electric arc.

12. The method of claim 11, wherein said step of locally surface heating comprises heating with an electric discharge of short duration.

13. The method of claim 5, wherein the step of placing the locally heated surface portion of the substrate in an atmosphere having a low partial pressure of nitrogen further comprises obtaining said low partial pressure of nitrogen by vacuum or by providing an inert gas other than nitrogen.

14. The method of claim 2, wherein the step of providing nitrogen comprises providing less than approximately 5% nitrogen in interstitial solution in the substrate.

15. The method of claim 3, wherein the step of providing carbon comprises providing less than approximately 0.05% carbon in interstitial solution in the substrate.

* * * * *